UNITED STATES PATENT OFFICE.

LEON HIRSCHBERG, OF HALENSEE, NEAR BERLIN, GERMANY, ASSIGNOR TO FIRM OF CHEMISCHE FABRIK WESTEND, OF CHARLOTTENBURG, NEAR BERLIN, GERMANY.

PROCESS FOR MANUFACTURING OILS SOLUBLE IN WATER.

1,042,915.  Specification of Letters Patent.  Patented Oct. 29, 1912.

No Drawing.  Application filed March 30, 1912. Serial No. 687,452.

*To all whom it may concern:*

Be it known that I, LEON HIRSCHBERG, a citizen of the German Empire, residing at Halensee, near Berlin, Germany, have invented certain new and useful Improvements in Processes for Manufacturing Oils Soluble in Water, of which the following is a specification.

This invention relates to a process for the manufacture of oils soluble in water, consisting in treating hydro-carbons, especially those fractions of hydrocarbons of a high boiling point, with acids at a high temperature until, on the product being allowed to settle, there is produced over a dark layer chiefly consisting of acid tar and sulfonic acids, an upper layer of oil which can be made into an emulsion with water in any desired proportion.

The treatment of hydrocarbons for the purpose of forming an oil product soluble in water, is preferably carried out with sulfuric acid containing anhydrid or with sulfurous acid; in each case the temperatures of treatment of about 110° C. has been found to be the most suitable. The temperatures of treatment however can be varied, although practically only within comparatively narrow limits, between about 100 and 130°, as below the first temperature an unsatisfactory reaction of the hydrocarbons takes place, and above the highest temperature mentioned, there is an excessive loss by destructive oxidation. For properly carrying out the process, it is necessary to use comparatively large quantities of acid, for instance 200% of the quantity of oil.

The process can be carried out for instance in the following manner:

A. Process with sulfuric acid: 100 kg. of a mineral oil distillate are mixed with 200 kg. of fuming sulfuric acid containing 15–20% anhydrid. By regulating the supply of sulfuric acid, in combination with a heating and a cooling coil, the temperature of the mixture is brought to, or held at 100–110°. After about half an hour's stirring the mixture is allowed to stand until as complete as possible separation of the upper oil layer which can be now formed into an emulsion with water, from a thick bottom layer consisting of sulfonic acid and acid tar has taken place. This state is generally reached in about five hours. The acid tar is then discharged from the vessel, so that oil alone remains therein. Thus about 60 kg. of oil that can be formed into an emulsion, are obtained. As the acid tar still contains oil soluble in water, it is advisable to press it out, whereby the yield is increased by another 10 kg. The oil product soluble in water contains at first considerable quantities of mechanically bound sulfurous acid which can be removed by well known methods, for instance by ordinary stirring and allowing to settle.

B. Process with sulfurous acid: In a laboratory experiment, 500 gr. of a mineral oil distillate mixed with about 5% of water, were heated in a bottle or vessel up to about 115°. Into the oil in question sulfurous acid generated in a Kipp apparatus was introduced. At the same time a current of air was introduced into the oil so as to keep the liquid in constant movement. After about half-an-hour's reaction, a dark mass consisting of acid tar and sulfonic acid, separated from the oil. The supply of sulfurous acid and air was then stopped, the mass left to stand and treated as described under "A." The process can be of course carried out also with liquid sulfurous acid.

Hydrocarbons soluble in water and obtained in the manner described, can be given a greater viscosity by charging them with alkalis that is to say with alkalis proper or with alkaline earths. To that end, hydrocarbons or oils soluble in water, are preferably treated with hydroxids or carbonates of alkaline metals or metals of the alkaline earths, and the water separated or carbonic acid and water, are removed. For instance each 100 kg. of hydrocarbons soluble in water and obtained by the treatment with acid at an increased temperature, are gradually mixed with 9 kg. of 12% soda lye by stirring at a gentle heat. During the addition of the lye, the increase of consistency will be noticed, which however disappears again when the heating is increased. The heating, for instance up to 105° C., is continued until the water is completely expelled. The final product, compared to the hydrocarbon soluble in water and used as the raw material, represents a bright light-colored oil of great viscosity which can be mixed with water in any proportion and produces with it absolutely neutral mixtures.

Solubility in water of the product obtained by the process described, is based on the conversion of the hydrocarbons produced by long action of large quantities of acid, under heat. Sulfonic acids which are formed also during the treatment of hydrocarbons with small quantities of acid, more particularly sulfuric acid, during ordinary oil refining, and which also are capable of forming emulsions, must be carefully separated from the hydrocarbons which can be formed into emulsions with water.

By the term "sulfur-containing mineral acids" in the claims, is intended such sulfur acids as are oxidizing in their action upon such hydrocarbons as herein described, and are capable of forming sulfonic acids by treatment at high temperature with the hydrocarbons.

What I claim is:—

1. A process for manufacturing oils emulsifiable with water, comprising heating a hydrocarbon with oxidizing mineral acids containing fuming sulfuric acid to a high temperature in such quantities that for a given weight of oil, not less than two and one-half per cent. by weight of sulfur trioxid in fuming sulfuric acid is employed, and continuing with such heating until, after settling, products of the reaction separate in two layers, an upper layer emulsifiable with water, and a lower layer, and recovering the upper layer.

2. A process for manufacturing oils emulsifiable with water comprising heating a hydrocarbon with not less than one-half its weight of fuming sulfuric acid to a high temperature in such quantities that for a given weight of oil not less than two and one-half per cent. by weight of sulfur trioxid in fuming sulfuric acid is employed, and continuing the heating until reaction products separate after settling, into an upper layer emulsifiable with water, and a lower layer, removing the lower layer, and treating the upper layer with an alkali.

3. A process for manufacturing oils emulsifiable with water comprising heating a hydrocarbon with about double its weight of fuming sulfuric acid for a considerable time to a temperature of about 100° to 130° centigrade, allowing the reaction products to settle and separate into two layers, the upper layer forming the emulsifiable oil, and a lower layer.

4. A process for manufacturing oils emulsifiable with water comprising heating a hydrocarbon with not less than one-half its weight of a sulfur-containing mineral acid to a high temperature, and continuing the heating until reaction products separate after settling, into an upper layer which will form an emulsion with water, and a lower layer, removing said lower layer, and treating the upper layer with a neutralizing substance.

5. A process for manufacturing oils emulsifiable with water comprising heating a hydrocarbon with not less than one-half its weight of a sulfur-containing mineral acid to a high temperature, and continuing the heating until reaction products separate after settling into an upper layer which will form an emulsion with water and a lower layer, and recovering the upper layer.

In testimony whereof I affix my signature in presence of two witnesses.

LEON HIRSCHBERG.

Witnesses:
HENRY HASPER,
WOLDEMAR HAUPT.